3,218,337
DIBENZOTHIOPHENES AND DIBENZOFURANS
Ernest Bryson McCall, Llangollen, and Terence James Rawlings, Johnstown, Wrexham, Wales, assignors to Monsanto Chemicals Limited, London, England, a British company
No Drawing. Filed Dec. 14, 1961, Ser. No. 159,448
Claims priority, application Great Britain, Dec. 20, 1960, 43,690/60
3 Claims. (Cl. 260—329.3)

This invention relates to certain new heterocyclic compounds, which possess good thermal stability and can, for example, be employed as functional fluids.

There is a demand for chemical substances which are both liquid and stable at elevated temperatures, particularly if also they are relatively inert, because substances of this type find application in function fluids, for instance heat transfer media. Other functional fluids where the substances are useful ar hydraulic fluids that are required to operate at high temperatures.

It has now been found that certain new substituted dibenzothiophenes and dibenzofurans possess a combination of properties which makes them useful as functional fluids. The new compounds have a good heat stability, and they can be employed at what are relatively very high temperatures.

The new compounds of the invention are dibenzothiophenes or dibenzofurans that are substituted by an aryl group or a cycloalkyl group.

Where the new compound of the invention is a dibenzothiophene or dibenzofuran that is substituted by an aryl group, then the process of the invention is one in which such a compound is produced by dehydrogenation of a dibenzothiophene or dibenzofuran substituted by an appropriate cycloalkenyl group. For example, a dibenzothiophene or dibenzofuran that is substituted by a phenyl group is produced by dehydrogenation of a dibenzothiophene or dibenzofuran substituted by a cyclohexenyl group. Where the final substituent is a naphtyl group, the starting material is substituted by a tetrahydronaphthyl group.

Where the new compound of the invention is a dibenzothiophene or dibenzofuran that is substituted by a cycloalkyl group, then the process of the invention is one in which such a compound is produced by hydrogenation of a dibenzothiophene or dibenzofuran substituted by an appropriate cycloalkenyl group. For example, a dibenzothiophene or dibenzofuran that is substituted by a cyclohexyl group is produced by hydrogenation of a compound substituted by an appropriate cyclohexenyl group.

Also part of the invention is a heat transfer system and a system for the transmission of power, in which there is employed respectively as heat transfer medium and as hydraulic fluid a new dibenzothiophene or dibenzofuran as defined above.

A single compound of the invention can be employed as a functional fluid, or a mixture of more than one of the compounds can be so employed. Moreover, a fluid can also include a substance known to possess thermal stability such as, for example, diphenyl or diphenyl ether.

The novel compounds of this invention are represented by the formula

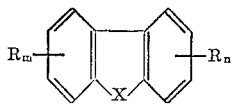

where X is selected from oxygen and sulfur, $n$ is an integer from 0 to 2, $m$ is an integer from 1 to 2, and each R is selected from cycloalkyl of 5 to 7 carbon atoms, alkylated cycloalkyl of 6 to 11 carbon atoms, phenyl, benzylphenyl, diphenylyl, alkylated phenyl of 7 to 19 carbon atoms, naphthyl and alkylated naphthyl of 11 to 14 carbon atoms. It should be noted that, in addition to the R substituents, either or both of the benzene nuclei can contain a lower alkyl substituent (e.g. methyl, ethyl, propyl, butyl) or a halogen (e.g. chlorine, bromine, fluorine, iodine).

The following radicals are illustrative of those which are represented by R; cyclopentyl, cyclohexyl, cycloheptyl, 2-methylcyclohexyl, 2-ethylcyclopentyl, 3-isopropylcycloheptyl, 2,5 - diethylcyclopentyl, 2,3,4 - trimethylcyclohexyl, 1-methyl-2-ethylcyclohexyl, phenyl, benzlyphenyl, diphenylyl, tolyl, xylyl, mesitly, ethylphenyl, t-butylphenyl, n-hexylphenyl, 2-ethylhexylphenyl, n-dodecylphenyl, cumyl, 2,5-diisopropylphenyl, α-naphthyl, β-naphthyl, methylnaphthyl, ethylnaphthyl, t-butylnaphthyl, dimethylnaphthyl and the like.

Within the broad generic class of novel compounds of this invention, a particularly preferred group of compounds are those wherein the sum of $m + n$ is an integer from 1 to 2, and each R is selected from cyclohexyl, phenyl, and alkylated phenyl of 7 to 10 carbon atoms. Such preferred compounds are characterized by especially desirable properties in the areas noted above.

In the process for the production of a compound of the invention in which the substituent is an aromatic group the dehydrogenation of the corresponding cycloalkenyl group is usually brought about by heating in the presence of a dehydrogenation agent, such as sulfur, selenium, platinum or paladium. The last named agent is particularly effective and can conveniently be employed in a form in which the palladium is absorbed on a support, for example carbon powder, and in which the weight of palladium is prehaps 5 or 10% of the total.

The amount of the dehydrogenating agent can vary from about 0.25% to about 5% by weight of the cycloalkenyl-substituted compound and can usefully be about 1 or 2%. The reaction temperature can, for example, be one within the range from about 150° C. to about 350° C., particularly one of about 300° C. The time required to effect complete dehydrogenation will depend on a number of factors such as the reaction temperature and the amount of dehydrogenation agent employed, but will often be between about 3 and 12 hours. It is usually possible to follow the course of reaction by examining the infra-red absorption spectrum of the mixture, and to determine the end point by the disappearance of the bands in the spectrum which are characteristic of the methylene group.

In the process of the invention for preparation of a compound having a cycloalkyl substituent the conditions for the hydrogenaiton of the corresponding cycloalkenyl compound need, of course, to be such that only the cycloalkenyl group is hydrogenated while the dibenzothiophene or dibenzofuran nucleus remains substantially unaffected.

Conveniently the hydrogenation is effected by employing hydrogen in the presence of a hydrogenation catalyst such as platinum or palladium under relatively mild conditions, for example, at temperatures up to about 100° C. and at pressures of hydrogen of not more than about 200 pounds per square inch. Often it is quite satisfactory to operate at room temperature and pressure. The catalyst, if a metal such as platinum or palladium, is conveniently employed in a form in which it is absorbed on particles of a support such as carbon powder. The reaction is normally regarded as complete when the calculated quantity of hydrogen has been absorbed.

As has been stated, whether the compound of the invention is substituted by an aromatic group or a cycloalkyl group, it is in either event produced from a dibenzothiophene or dibenzofuran having an appropriate cycloalkenyl or tetrahydronaphthyl substituent. These starting materials themselves can be made by reaction of an aliphatic ketone, corresponding to the cycloalkenyl or tetrahydronaphthyl group it is desired to introduce, with an appropriate Grignard derivative derived from a halogen-substituted dibenzothiophene, or dibenzofuran; preferably a bromine-substituted compound is employed. Substantially stoichiometric amounts of the halogen-substituted compound and magnesium are usually employed, and the reaction is most satisfactorily carried out in the presence of a solvent and at a temperature above normal room temperature, for example one within the range of say 35° C. to 95° C., and conveniently at the boiling point of the solvent. The solvent should be one which is inert, and it is preferably one in which the halogen compound has a moderate solubility. Generally the appropriate halogen compounds are insufficiently soluble in boiling diethyl ether (the most commonly employed solvent in the Grignard reaction) to permit their use in the present instance, and a solvent with a higher boiling point, for example methyl n-butyl ether, di n-propyl ether or tetrahydrofuran, is required. The last-named solvent has been found particularly satisfactory.

The quantity of the aliphatic ketone employed to react with the Grignard derivative is preferably the stoichiometric amount, although there can be a slight excess or deficiency without affecting the reaction significantly. It is usual to add the ketone to the Grignard derivative as a solution in a solvent, generally the same solvent as that employed in the preparation of the Grignard derivative. This is not essential however, provided the solvent chosen for the ketone is similarly inert and provided that its use will not complicate the isolation of the final product; the solvent can, if desired, be dispensed with altogether if the ketone is itself a liquid. The reaction of the ketone is preferably carried out at a temperature above normal room temperature, for example within the range 35° C. to 95° C., and conveniently at the boiling point of the solvent.

The invention is illustrated by the following examples:

*Example 1*

This example describes the preparation of 2-phenyldibenzothiophene by the dehydrogenation of 2-(1'-cyclohexenyl) dibenzothiophene.

2-(1'-cyclohexenyl)dibenzothiophene was first prepared in the following way. A solution of 55.2 grams (0.21 mol.) of 2-bromodibenzothiophene in 90 cc. of dry tetrahydrofuran was added drop-wise, with stirring, to magnesium turnings at such a rate that vigorous refluxing of the solvent occurred. The mixture was stirred for 10 minutes after the addition was complete. 20.7 grams (0.21 mol.) of cyclohexanone were then added, and the reaction mixture was heated for 2 hours on a steam bath. Acidification of the cooled mixture with dilute hydrochloric acid led to the separation of an oil. This was extracted with ether; the ethereal solution was washed with dilute sodium hydroxide solution, then with water, and finally dried over calcium chloride. After removal of the solvent the residue was distilled to give 32.3 grams of 2-(1'-cyclohexenyl)dibenzothiophene as a colorless oil with a boiling point of 202° to 214° C. at 0.5 mm. of mercury pressure.

32.3 grams of the 2-(1'-cyclohexenyl)dibenzothiophene were heated for 6 hours at 300° to 310° C. with 5 grams of powdered carbon on which was absorbed 5% by weight of palladium. Dehydrogenation was complete at the end of this time. The reaction product was dissolved in benzene, the hot solution was filtered, the benzene was evaporated from the filtrate, and the residue was distilled under reduced pressure. 5.9 grams of 2-phenyldibenzothiophene were obtained as a pale yellow oil, boiling point 197°–202° C. at 0.4 mm. of mercury pressure; the oil solidified on standing, and after crystallization from acetic acid, the product was obtained in the form of colorless needles, melting point 73°–74° C.

The thermal stability of the molten compound was studied using an isotenoscope. The "decomposition temperature" (defined as the temperature at which the rate of increase in the isothermal vapor pressure of the liquid was 0.84 mm. of mercury pressure per minute) was 428° C. Accordingly the 2-phenyldibenzothiophene was suitable for use as a functional fluid, for example as a heat transfer medium, within a temperature range of say 75° C. to 425° C.

*Example 2*

4-(1'-cyclohexenyl)dibenzothiophene was obtained as a pale yellow oil with a boiling point of 200° to 230° C. at 1.6 mm. of mercury pressure, from 4-bromodibenzothiophene and cyclohexanone by essentially the same procedure as that described in Example 1 for the 2-isomer. On dehydrogenation with palladium on carbon, 4-(1'-cyclohexenyl)dibenzothiophene gave 4-phenyldibenzothiophene, a solid with a melting point of 67.5° to 69° C. It had a "decomposition temperature" of 468° C., and could accordingly be made use of up to a somewhat higher temperature than the compound of Example 1.

*Example 3*

1-phenyldibenzothiophene was obtained in a similar way to that described in Example 1, by the hydrogenation of 1-(1'-cyclohexenyl)dibenzothiophene. The product was first obtained by distillation of the reaction mixture as a colorless oil with a boiling point of 200°–203° C./1.5 mm. mercury pressure. On standing the oil crystallized; this was sublimed to give colorless crystals of melting point 45.5°–48° C. The decomposition temperature of the molten compound was above 448° C.

The 1-(1'-cyclohexenyl)dibenzothiophene employed as starting material was made as follows. A solution of 6 grams (0.023 mol.) of 1-bromodibenzothiophene (prepared by the method of Gilman and Jacoby, Journal of Organic Chemistry, 3, 108–9, 1939) in 20 cc. of dry tetrahydrofuran was added dropwise with stirring to magnesium turnings at such a rate that vigorous refluxing occurred. When the addition was complete, the mixture was refluxed for 45 minutes. A solution of 2.24 grams (0.023 mol.) of cyclohexanone in 5 cc. of dry tetrahydrofuran was added during 5 minutes to the stirred solution of the Grignard derivative, and the mixture was then boiled for 2 hours. The product was worked up as described in Example 1 to give 4.9 grams (81.5% of theory) of 1-(1'-cyclohexenyl)dibenzothiophene as a pale yellow oil, boiling point 216°–226° C., at 1.5 mm. of mercury pressure.

*Example 4*

This example describes the preparation of 2,8-di(1'-cyclohexenyl)dibenzothiophene and its dehydrogenation to 2,8-diphenyldibenzothiophene.

A solution of 2 grams of 2,8-dibromodibenzothiophene (prepared by the direct dibromination of dibenzothiophene) in 125 cc. of dry tetrahydrofuran was added to 2.16 grams of magnesium turnings, and the mixture was stirred and heated to reflux temperature. A porous thimble containing 13.2 grams of 2,8-dibromodibenzothiophene (making a total of 15.2 grams, 0.0444 mol.) was interposed between the reflux condenser and the reaction vessel so that the dibromo compound was gradually dissolved by the refluxing solvent and transferred in solution to the reaction vessel. After 6 hours the reaction was complete. The Grignard compound was reacted with 8.7 grams (0.0888 mol.) of cyclohexanone, and by essentially the same procedure as in the previous examples, 6.4 grams (42% of theory) of 2,8-di(1'-cyclohexenyl)dibenzothiophene was obtained as a yellow oil with a boiling point of 252°–285° C. at 1.5 mm. mercury pressure.

A mixture of 6.4 grams of 2,8-di(1'-cyclohexenyl) dibenzothiophene and 5 grams of powdered carbon on which was absorbed 5% by weight of palladium was heated at 300° to 310° C. for 6 hours. The reaction product was dissolved in benzene, and the hot solution was filtered. Concentration of the filtrate give 3.1 grams of 2,8-diphenyldibenzothiophene as a white crystalline material with a melting point of 173° to 175° C., which was raised to 176° to 177.5° C. by recrystallization from glacial acetic acid. The "decomposition temperature" of the material was 451° C.

*Example 5*

This example describes the preparation of 2-cyclohexyldibenzothiophene by the hydrogenation of 2-(1'-cyclohexenyl)dibenzothiophene.

10 grams of 2-(1'-cyclohexenyl)dibenzothiophene were dissolved in 30 cc. of acetone, and 4 grams of carbon powder on which was absorbed 5% of its weight of palladium were added. The mixture was shaken under hydrogen at atmospheric pressure and temperature until after four hours the absorption of hydrogen was complete. The solution was then filtered while warm to remove the catalyst, and the solvent was evaporated from the filtrate. The residue was distilled under reduced pressure to give 5.7 grams of 2-cyclohexyldibenzothiophene as a pale yellow oil, boiling point 186°–189° C. at 0.4 mm. of mercury pressure. The compound had a "decomposition temperature" of 363° C.

*Example 6*

This example describes the preparation of 3(1'-cyclohexenyl)dibenzothiophene and its dehydrogenation to 3-phenyldibenzothiophene.

The reaction of 15.2 grams of 3-bromodibenzothiophene with 1.4 grams om magnesium and 5.7 grams of cyclohexanone in tetrahydrofuran, and isolation of the product by essentially the same procedures as those used for the cyclohexenyldibenzothiophene of Example 1, gave 8.4 grams of 3(1'-cyclohexenyl)dibenzothiophene. This was a yellow oil having a boiling range of 212° to 225° C. at a pressure of 0.7 mm. of mercury.

8.4 grams of 3(1'-cyclohexenyl)dibenzothiophene were heated at 310° C. for 8 hours with 3 grams of powdered carbon on which was absorbed 5% by weight of palladium. Examination of a sample of the produce at the end of this time by I.R. spectroscopy showed the presence of residual cyclohexenyl groups. The catalyst was replaced by 3 grams of fresh material, and heating was then continued for a further 8 hours to complete the dehydrogenation. The final reaction mixture was dissolved in hot benzene, the solution filtered, and the solvent evaporated from the filtrate. The crude product thus obtained was recrystallized from ethanol to give 5.2 grams of 3-phenyldibenzothiophene as colorless crystals having a melting point of 178.5° to 179.5° C. The "decomposition temperature" of 3-phenyldibenzothiophene was 432° C.

*Example 7*

This example describes the preparation of 1,4-di(1'-cyclohexenyl)dibenzothiophene and its dehydrogenation to 1,4-diphenyldibenzothiophene.

1-bromo-4-aminodibenzothiophene was diazotized with nitrosyl sulfuric acid in glacial acetic acid, and the diazonium salt was converted to 1,4-dibromodibenzothiophene by reaction with hydrobromic acid and cuprous bromide.

The reaction of 13 grams of 1,4-dibromodibenzothiophene with 1.9 grams of magnesium and 7.5 grams of cyclohexanone in tetrahydrofuran, and isolation of the product by essentially the same procedures as those used for the cyclohexenyldibenzothiophene of Example 1, gave 7.3 grams of 1,4-di(1'-cyclohexenyl)dibenzothiophene. This was a pale yellow oil having a boiling range of about 250° to 300° C. at a pressure of 2.5 mm. of mercury.

A mixture of 7.3 grams of 1,4-di(1'-cyclohexenyl)dibenzothiophene and 6 grams of powdered carbon on which was absorbed 5% by weight of palladium was heated at 310° C. for 6 hours. At the end of this time the product was found to contain unchanged starting material, and after replacing the original catalyst by a fresh sample, heating was continued at the same temperature for a further 6 hours to complete the dehydrogenation. The product, isolated as described for the phenyldibenzothiophene of the previous example, was shown by vapor phase chromatography to consist essentially of the required 1,4-diphenyldibenzothiophene.

*Example 8*

This example describes the preparation of 2(1'-cyclohexenyl)dibenzofuran and its dehydrogenation of 2-phenyldibenzofuran.

The reaction of 30.8 grams of 2-bromodibenzofuran with 3 grams of magnesium and 12.3 grams of cyclohexanone in tetrahydrofuran, and isolation of the product by essentially the same procedures as those used for the cyclohexenyldibenzothiophene of Example 1, gave 17.7 grams of 2(1'-cyclohexenyl)dibenzothiophene. This was a pale yellow oil having a boiling range of 196° to 208° C. at a pressure of 1.5 mm. of mercury.

A mixture of 17.7 grams of 2(1'-cyclohexenyl)dibenzofuran and 4 grams of powdered carbon on which were absorbed 5% by weight of palladium was heated for 12 hours at 310° C. Dehydrogenation was complete at the end of this time, and the product was distilled to give 11.1 grams of 2-phenyldibenzofuran as a pale yellow oil having a boiling range of 188° to 192° C. at a pressure of 1.2 mm. of mercury. The oil solidified on standing, and, after recrystallization from glacial acetic acid, the product was obtained as colorless crystals having a melting point of 99°–100° C.

On elementary analysis, the following result was obtained:

Found: C, 88.72; H, 5.02%. $C_{18}H_{12}O$ requires: C, 88.50; H, 4.92%.

The "decomposition temperature" of 2-phenyldibenzofuran was 446° C.

*Example 9*

3-phenyldibenzofuran was obtained as a solid having a melting point of 130° to 131° C. by dehydrogenation of 3(1'-cyclohexenyl)dibenzofuran. This in turn was obtained from 3-bromodibenzofuran, magnesium and cyclohexanone, by a procedure essentially the same as that employed for the cyclohexenyldibenzofuran of Example 8, as a yellow oil having a boiling range of 200° to 210° C. at a pressure of 1 mm. of mercury.

The "decomposition temperature" of 3-phenyldibenzofuran was 449° C.

*Example 10*

4-phenyldibenzofuran was obtained as a colorless oil having a boiling point of 188°–190° C. at a pressure of 1.2 mm. of mercury by dehydrogenation of 4-(1'-cyclohexenyl)dibenzofuran. This in turn was obtained from 4-bromodibenzofuran, magnesium and cyclohexanone, by a procedure essentially the same as that employed for the cyclohexenyldibenzofuran of Example 8, as a yellow oil having a boiling range of 186° to 210° C. at a pressure of 0.6 mm. of mercury.

The "decomposition temperature" of 4-phenyldibenzofuran was 440° C., which meant that it was suitable for use as a functional fluid from normal ambient temperatures up to about 430° C.

When it is desired to prepare a compound of this invention wherein the sum of $m+n$ is at least 2, and there is at least one aryl and at least one cycloalkyl substituent, the procedure is a stepwise operation. For example, a dibromodibenzothiophene is converted to a bromo, cycloalkenyl dibenzothiophene. The cycloalkenyl substituent is then dehydrogenated to its aryl derivative. Next, another cycloalkenyl group is substituted for the remaining bromo substituent. The resultant aryl, cycloalkenyl dibenzothiophene is finally hydrogenated to produce the desired aryl, cycloalkyl dibenzothiophene. The hydrogenation step will not have any adverse effect upon the benzene nuclei already present.

Following the procedures set forth in detail in Examples 1 through 10, other exemplary compounds of this invention are prepared. Such other exemplary compounds include:

4-(2'-ethylphenyl)dibenzothiophene
2,6-di-o-tolyldibenzothiophene
1,4,8-trinaphthyldibenzothiophene
2,8-dibenzylphenyldibenzothiophene
1,4-di(diphenylyl)dibenzothiophene
2-cumyl-4-phenyldibenzothiophene
4,6-di(2-ethylhexylphenyl)dibenzothiophene
2,4,6,8-tetra-p-xylyldibenzothiophene
2,6-dimethylcyclohexyldibenzothiophene
4-cycloheptyldibenzothiophene
2-cyclopentyl-4-phenyldibenzothiophene
1,8-diphenyl-4-napththyldibenzothiophene
2-ethylnaphthyldibenzothiophene
2-mesityl-8-cyclohexyldibenzothiophene
2,8-dicyclohexyldibenzothiophene
1-cyclohexyldibenzofuran
4-o-tolyldibenzofuran
2,6-didodecylphenyldibenzofuran
1-ethylcyclopentyl-6-phenyldibenzofuran
1,4-dinaphthyl-8-cyclohexyldibenzofuran
2,4-diphenyl-6,8-diethylphenyldibenzofuran
1-mesityldibenzofuran
2,8-dicycloheptyldibenzofuran
1-diphenylyl-4-cumyldibenzofuran
2,4-dibenzylphenyl-8-naphthyldibenzofuran
1,4,8-tri-p-xylyldibenzofuran
1,6-dimethylcyclohexyldibenzofuran
2-t-butylphenyldibenzofuran
3-ethylcyclohexyl-6-phenyldibenzofuran
2,8-di(2-ethylhexylphenyl)dibenzofuran
1-ethylnaphthyldibenzofuran
2,8-dicyclohexyldibenzofuran While the invention has been described herein with respect to several specific embodiments, it is not so limited. It is to be understood that modifications and variations of this invention, obvious to those skilled in the art, may be made without departing from the spirit and scope of said invention.

The embodiments of this invention in which an exclusive property or privilege is claimed are defined as follows:

1. A compound of the formula

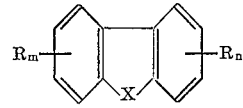

where X is selected from the group consisting of oxygen and sulfur, $n$ is an integer from 0 to 2, $m$ is an integer from 1 to 2, the sum of $m+n$ is an integer from the group consisting of 1 to 2, and each R is selected from cycloalkyl of 5 to 7 carbon atoms and monoalkylated cycloalkyl of 6 to 11 carbon atoms.

2. Cyclohexyldibenzothiophene.
3. Cyclohexyldibenzofuran.

References Cited by the Examiner
UNITED STATES PATENTS 2,873,297   2/1959   Ramsden _____ 260—329.3
2,983,731   5/1961   Meis et al. _____ 260—315

OTHER REFERENCES

Chemical Abstracts, vol. 28, pp. 3730 (1934), Abstracting Sako, Bull. Chem. Soc., Japan, 9: 55–74 (1934).

Cullinane: Trans. Faraday Soc., vol. 36 (1940), page 514.

Ellis: Hydrogenation of Organic Substances, 3rd edition, 1930, pp. 222–227.

Fieser et al.: Organic Chemistry, 3rd edition, 1956, pp. 544–45.

Fieser et al.: Organic Chemistry, Reinhold Pub. Corp., New York (1956), pages 519–23.

Hartough: Condensed Thiophenes, 1954, Interscience Publisher, Inc., New York, N.Y., p. 237.

Lowy et al.: Introduction to Organic Chemistry, John Wiley, New York (1945), pages 213–15, 222 and 240.

WALTER A. MODANCE, *Primary Examiner.*

IRVING MARCUS, *Examiner.*

UNITED STATES PATENT OFFICE
CERTIFICATE OF CORRECTION

Patent No. 3,218,337                                                    November 16, 1965

Ernest Bryson McCall et al.

It is hereby certified that error appears in the above numbered patent requiring correction and that the said Letters Patent should read as corrected below.

Column 8, lines 16 and 17, strike out "the group consisting of", and insert the same before "cycloalkyl" in line 18, same column 8.

Signed and sealed this 27th day of September 1966.

(SEAL)
Attest:

ERNEST W. SWIDER                                               EDWARD J. BRENNER
Attesting Officer                                                     Commissioner of Patents